United States Patent [19]

Naito et al.

[11] Patent Number: 5,050,176
[45] Date of Patent: Sep. 17, 1991

[54] DIRECT MODULATION PHASE-SHIFT-KEYING SYSTEM AND METHOD

[75] Inventors: Takao Naito, Kawasaki; Terumi Chikama, Machida; Shigeki Watanabe, Kawasaki; Tetsuya Kiyonaga, Kawasaki; Hiroshi Onaka, Kawasaki; Yoshihito Onoda, Kawasaki, all of Japan

[73] Assignee: Fujitsu Limited, Kawasaki, Japan

[21] Appl. No.: 540,284

[22] Filed: Jun. 19, 1990

[30] Foreign Application Priority Data

Jun. 19, 1989 [JP] Japan .................................. 1-154664

[51] Int. Cl.$^5$ ............................................. H01S 3/10
[52] U.S. Cl. ...................................................... 372/26
[58] Field of Search ..................... 372/26, 29, 31, 32

[56] References Cited

U.S. PATENT DOCUMENTS 4,884,278 11/1989 Nishimoto et al. .................... 372/26

Primary Examiner—James W. Davie
Attorney, Agent, or Firm—Staas & Halsey

[57] ABSTRACT

A direct modulation PSK system and method, in a coherent optical fiber transmission system, in which an injection current supplied to a laser diode is adapted to be directly varied is disclosed. In this system or method, a modulating current pulse is superposed on a bias current for the laser diode so that a specified phase condition may be satisfied. Thereby, a differential coding circuit and an external modulator being indispensable for a DPSK system become unnecessary and, in addition, the system becomes less susceptible to the influence of wavelength dispersion than the DPSK system and able to reproduce the carrier.

15 Claims, 14 Drawing Sheets

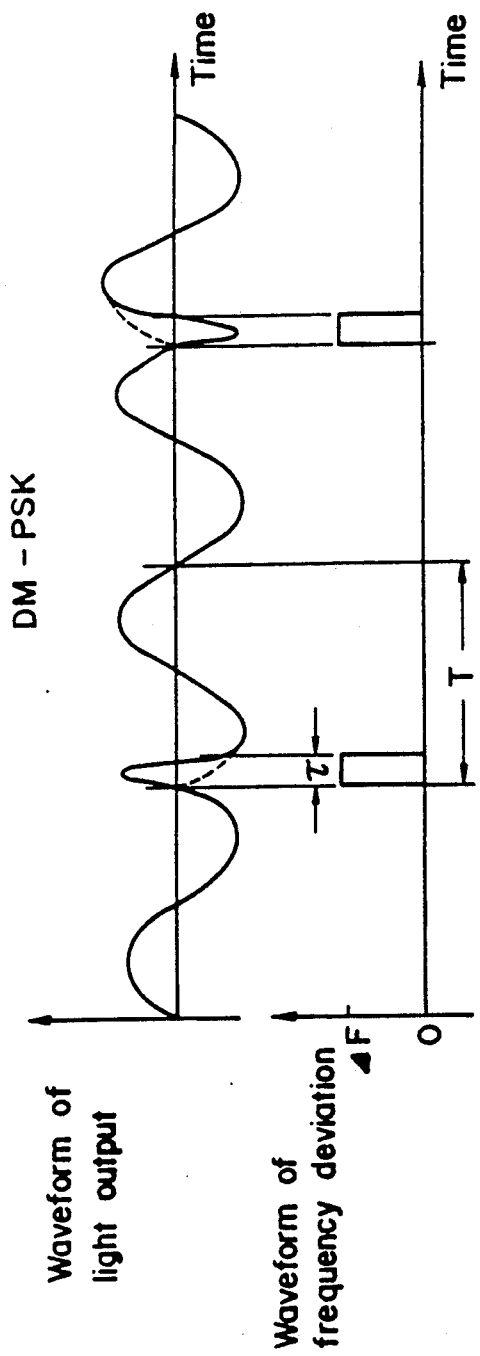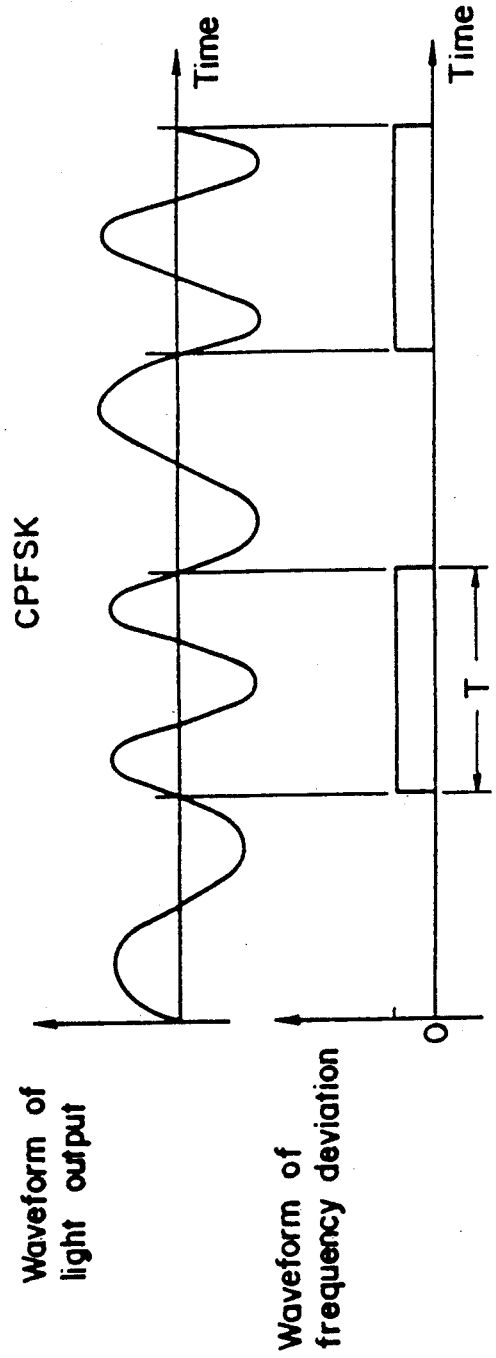

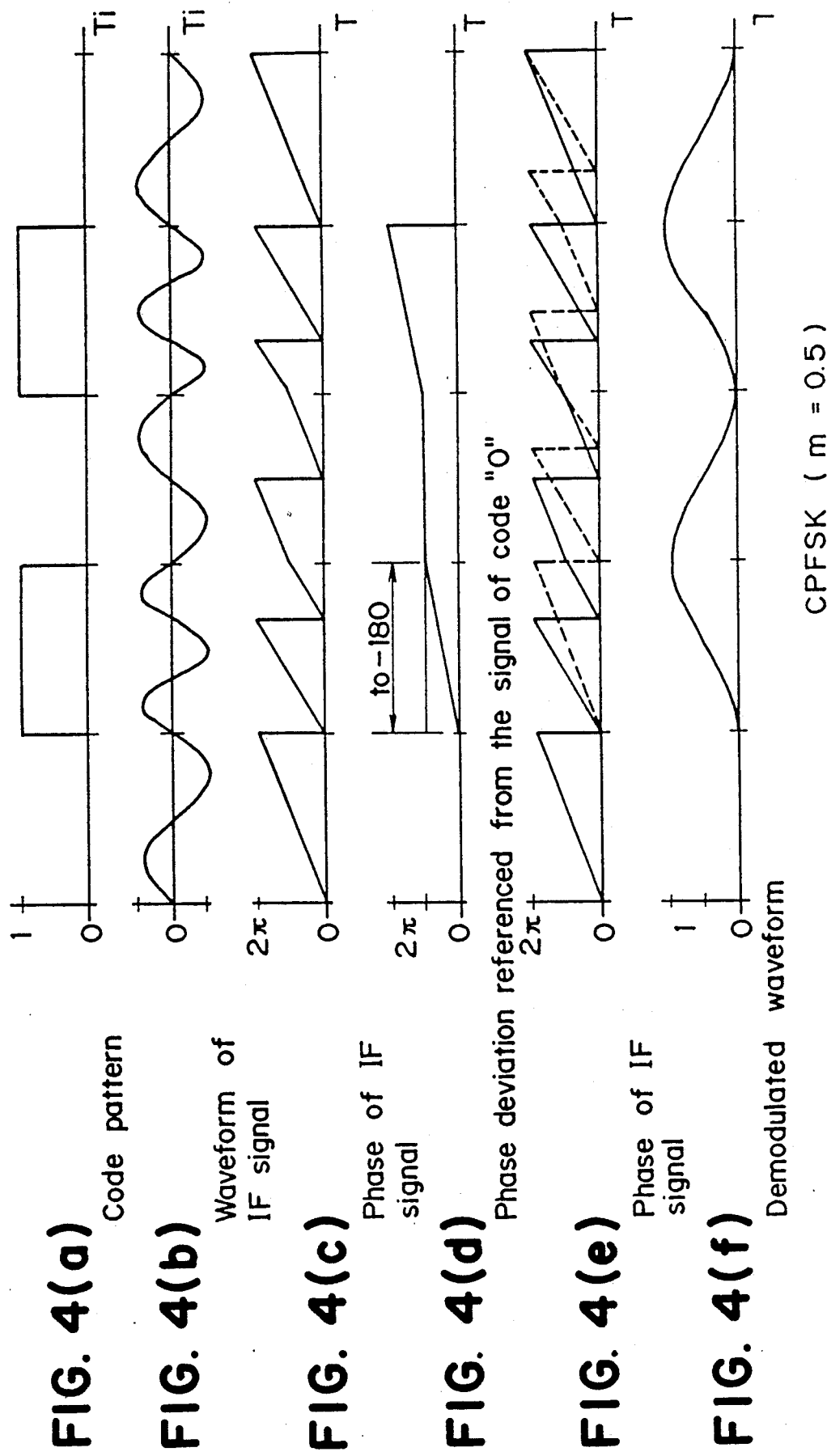

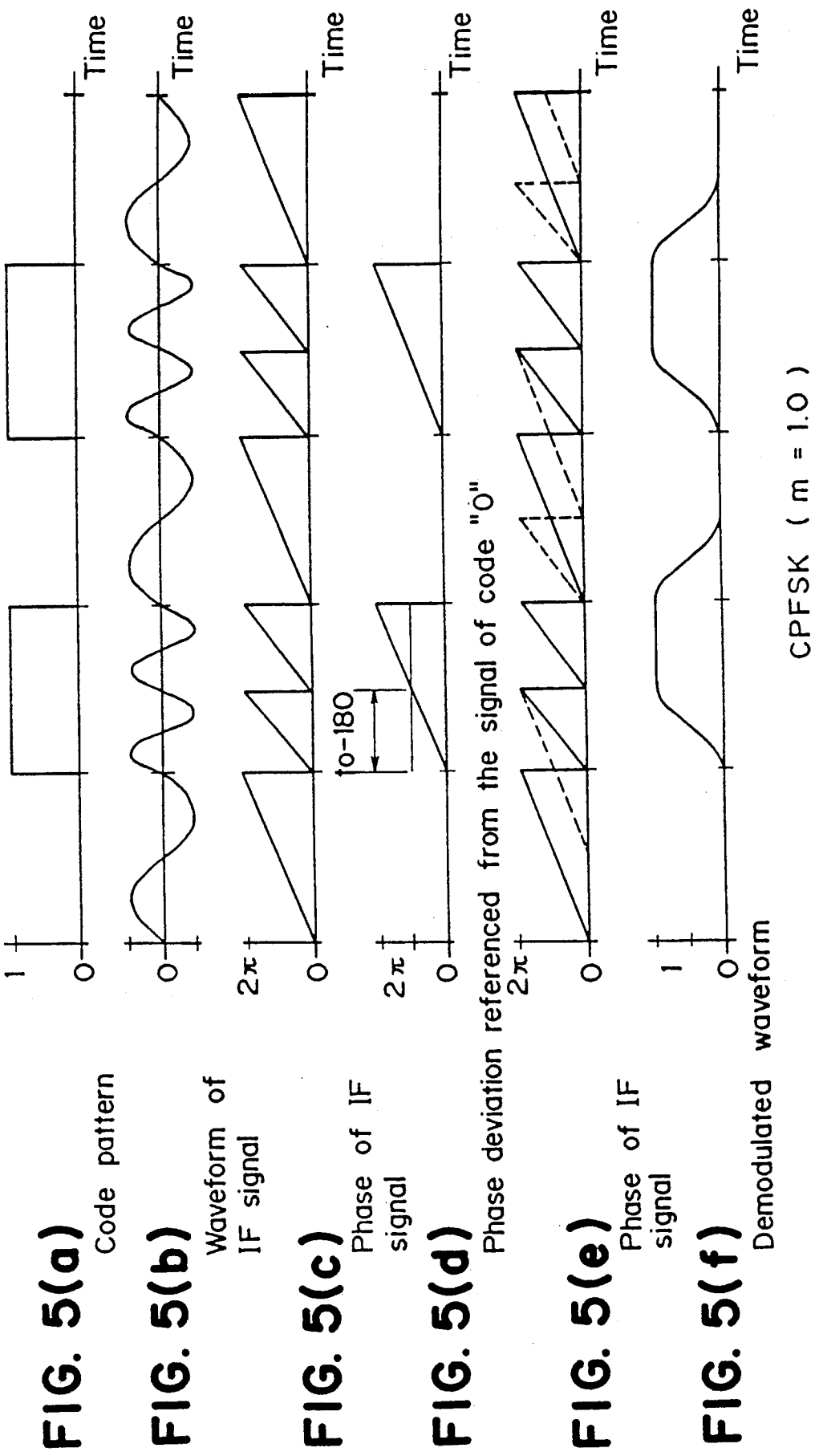

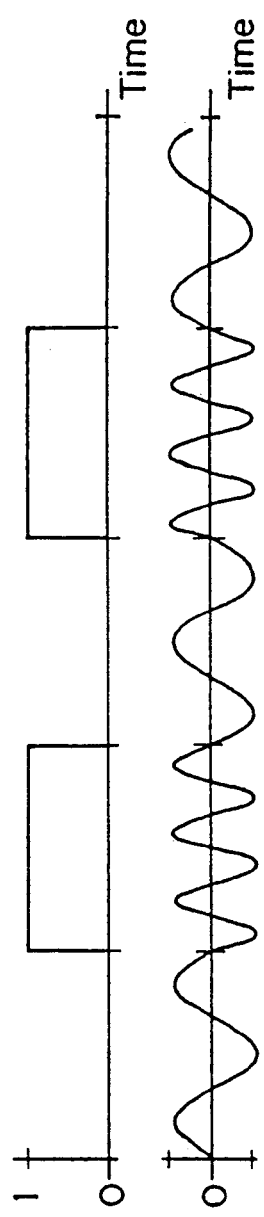
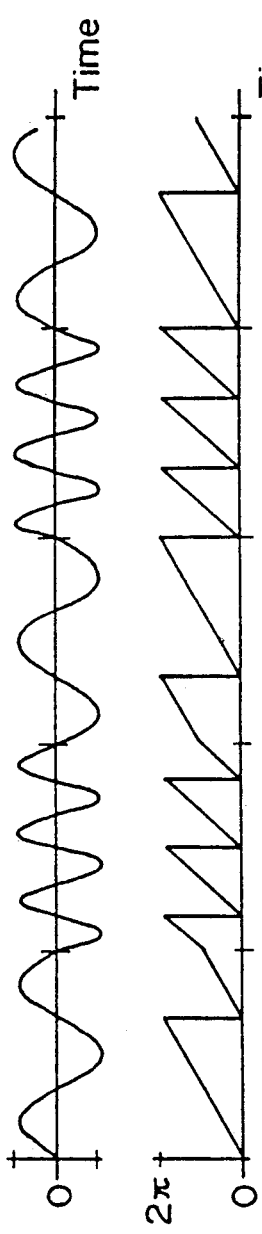
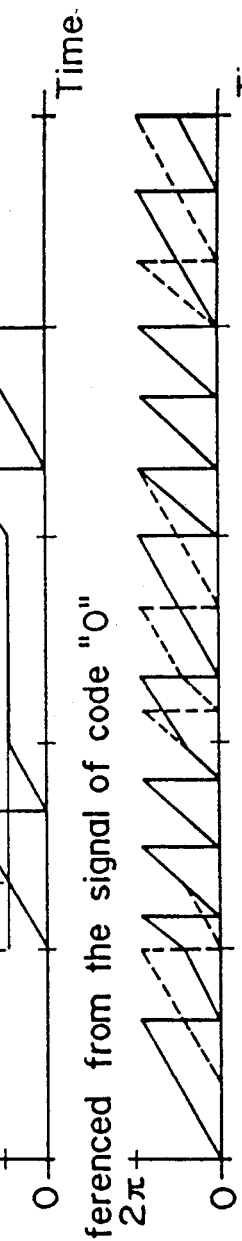
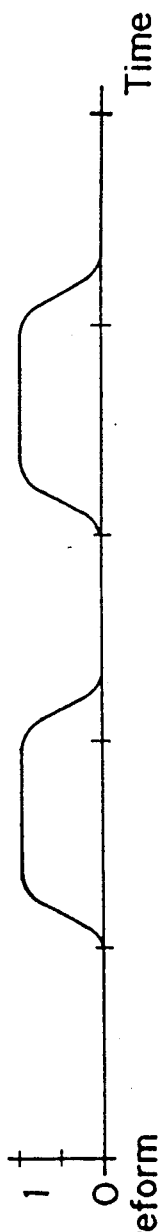
FIG. 6(a) Code pattern
FIG. 6(b) Waveform of IF signal
FIG. 6(c) Phase of IF signal
FIG. 6(d) Phase deviation referenced from the signal of code "0"
FIG. 6(e) Phase of IF signal
FIG. 6(f) Demodulated waveform
CPFSK (m = 1.5)

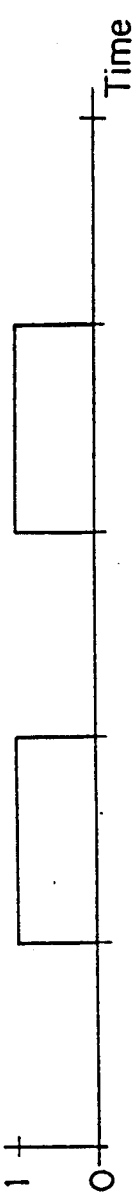
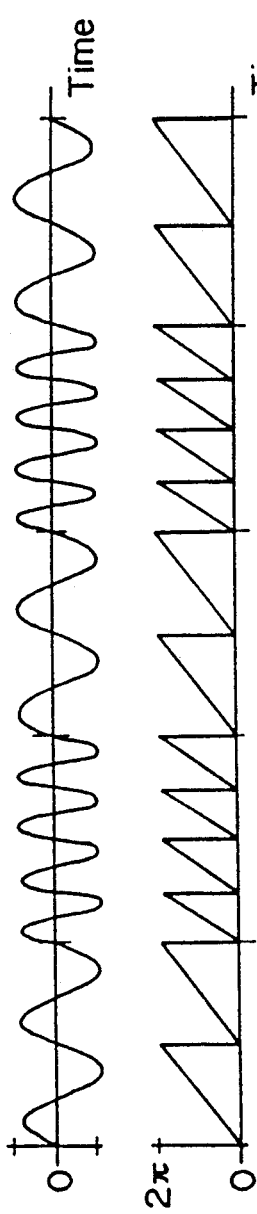
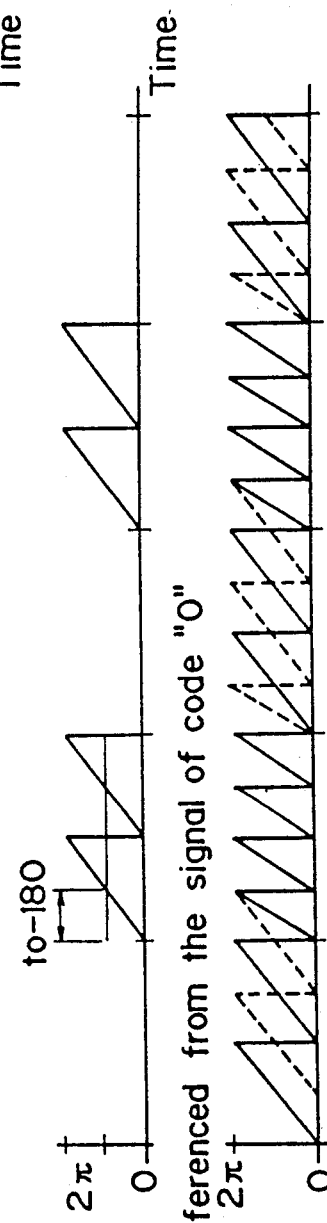
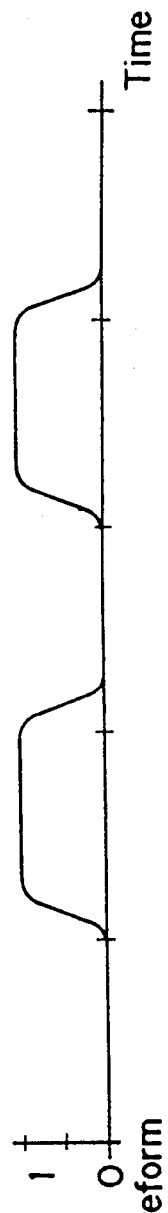
FIG. 7(a) Code pattern
FIG. 7(b) Waveform of IF signal
FIG. 7(c) Phase of IF signal
FIG. 7(d) Phase deviation referenced from the signal of code "0"
FIG. 7(e) Phase of IF signal
FIG. 7(f) Demodulated waveform
CPFSK ( m = 2.0 )

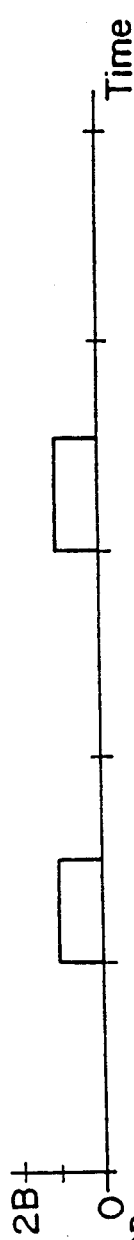
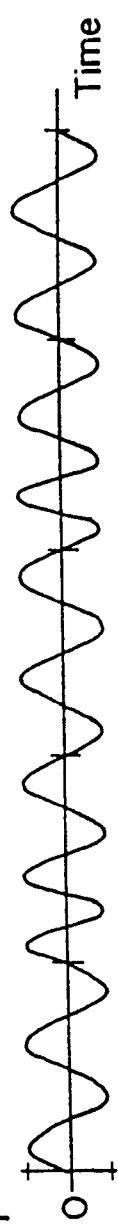
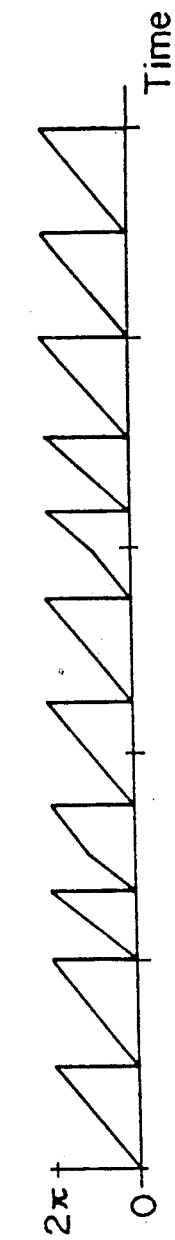
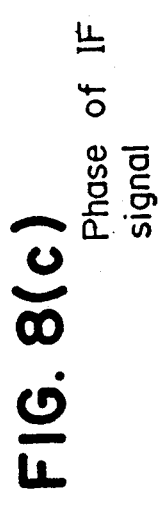
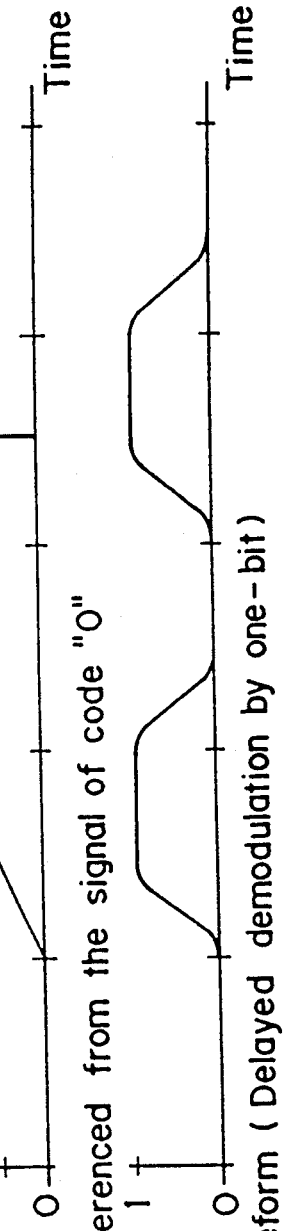
FIG. 8(a) Frequency deviation
FIG. 8(b) Waveform of IF signal
FIG. 8(c) Phase of IF signal
FIG. 8(d) Phase deviation referenced from the signal of code "0"
FIG. 8(e) Demodulated waveform (Delayed demodulation by one-bit)
DM−PSK ( m = 1.0 )

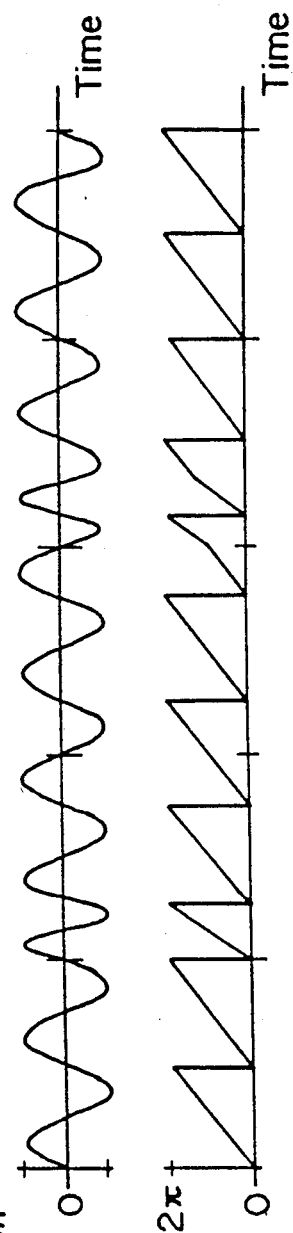
FIG. 9(a) Frequency deviation
FIG. 9(b) Waveform of IF signal
FIG. 9(c) Phase of IF signal
FIG. 9(d) Phase deviation referenced from the signal of code "0"
FIG. 9(e) Demodulated waveform (Delayed demodulation by one-bit)
DM−PSK ( m = 1.5 )

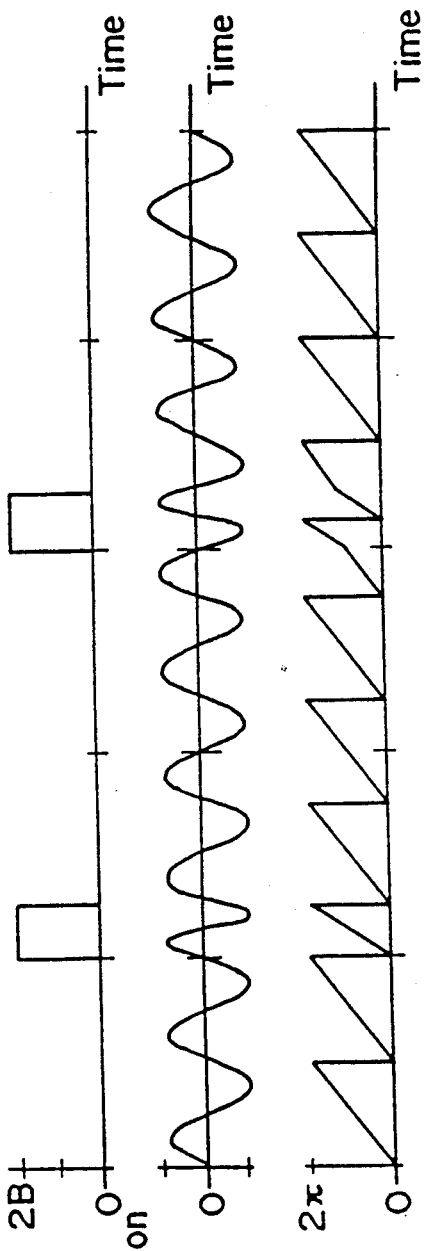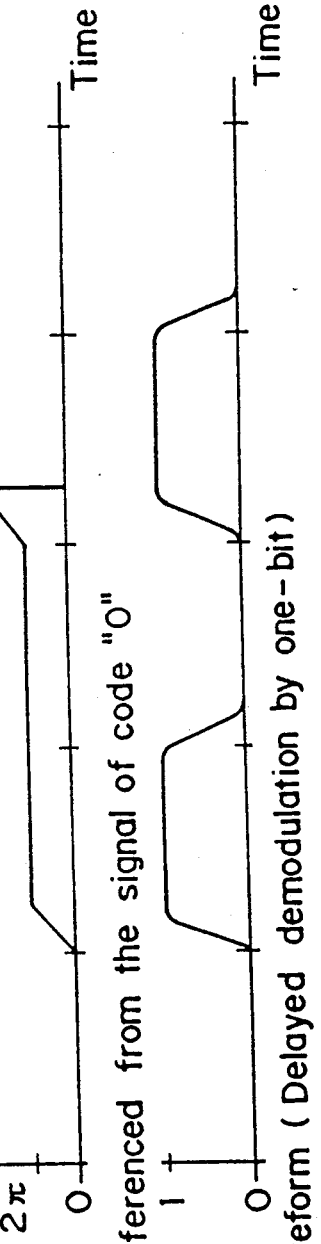
FIG. 10(a) Frequency deviation
FIG. 10(b) Waveform of IF signal
FIG. 10(c) Phase of IF signal
FIG. 10(d) Phase deviation referenced from the signal of code "0"
FIG. 10(e) Demodulated waveform (Delayed demodulation by one-bit)
DM−PSK (m = 2.0)

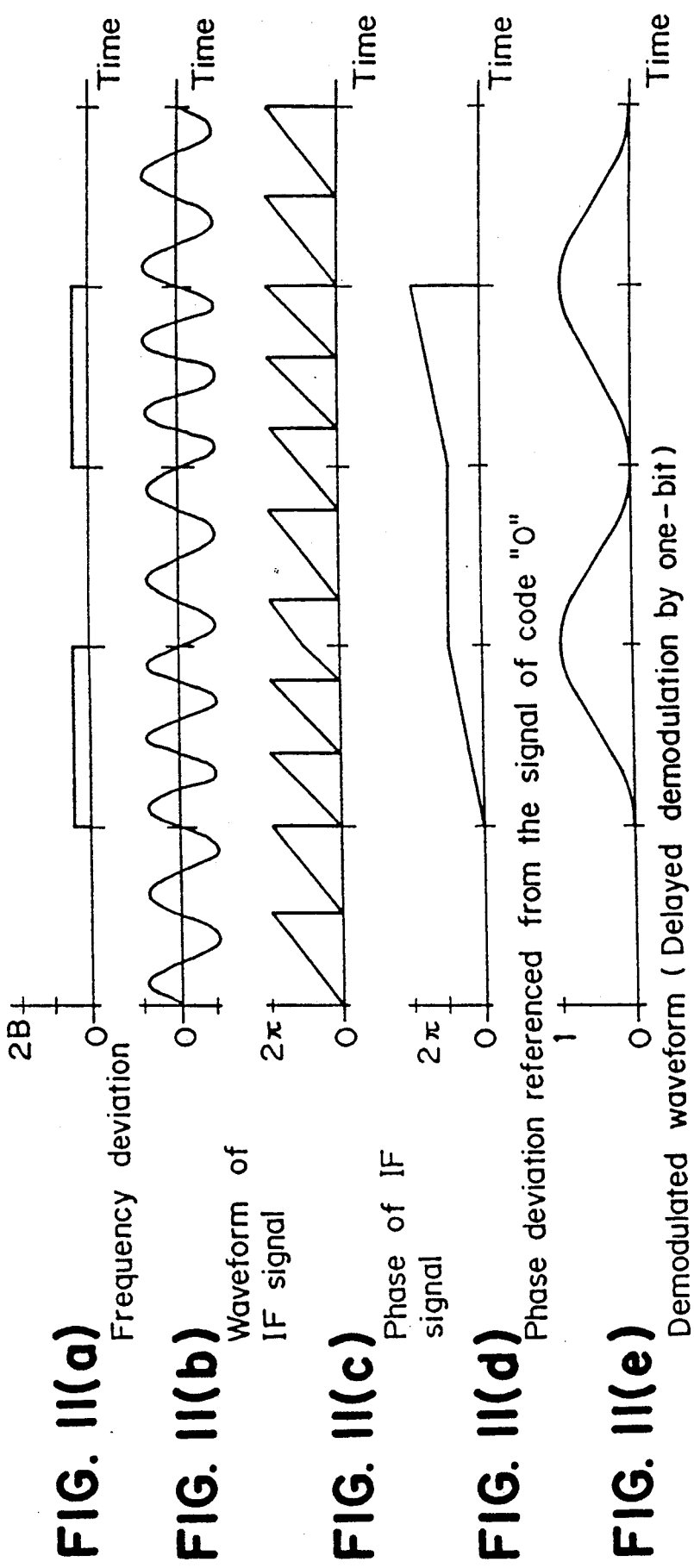

DIRECT MODULATION PHASE-SHIFT-KEYING SYSTEM AND METHOD

BACKGROUND OF THE INVENTION

The present invention relates to a PSK (phase shift keying) system and method in a coherent optical fiber transmission and more particularly to a PSK system and method adapted to be able to directly modulate an injection current supplied to a laser diode.

Of the optical fiber transmission systems in practical use today, an IM/DD (intensity modulation/direct detection) system in which an intensity modulated light beam is directly received by a photodetector and converted thereby into an electric signal is quite general. In recent years, however, research and development for a coherent optical fiber transmission system has become actively carried on because of strong demands for larger transmission capacity and longer transmission distance. According to this system, since a coherent light beam from a laser diode is used as the carrier and its frequency, phase, etc. are modulated on the transmission side and the received light beam is mixed with a local light beam so as to be subjected to heterodyne detection or homodyne detection on the reception side, a greater improvement in the reception sensitivity compared with the IM/DD system can be achieved. Further, after the detection of the light has been performed, i.e., after the light signal has been converted into an electric signal, frequency selection can be made rather easily. Hence, high-density frequency-division multiplexing can be achieved by this system and the transmission capacity by a single optical transmission path can thereby be greatly increased.

As a system or method for transmitting information with the information carried by the wave parameter of a light beam emitted from a laser diode and being suitable for high speed transmission, DPSK (differential phase shift keying) or CPFSK (continuous phase frequency shift keying) has hitherto been known.

In the DPSK system, in order that a demodulation by delayed detection by one bit is performed on the reception side, differential coding is made on the transmission side in advance. The modulation through the differentially coded signal is an indirect modulation using an external modulator.

In the CPFSK system, on the other hand, the oscillation frequency of the laser diode is directly modulated on the transmission side so that the phase deviation between different signs becomes over $\pi$ with the phase maintained continuous, and a demodulation with delayed detection is performed on the reception side. The delay time is set according to one time slot and the modulation index.

In the DPSK system, an external modulator is required and the loss due to its insertion (for example, 2 to 4 dB) becomes a cause of the deterioration in the reception sensitivity. Further, since most of the external modulators are such that utilize the electro-optic effect of an anisotropic crystal, it requires driving voltage of several to ten-odd Volts for obtaining a frequency band of several GHz. Further, a differential coding circuit is required for achieving a demodulation by delayed detection by one bit. Thus, the DPSK system becomes complex in structure.

In the CPFSK system, although neither external modulator nor differential coding circuit is required, the system is liable to be adversely affected by the wavelength dispersion and, hence, its transmission span is limited. Further, the carrier is unable to be reproduced for use in the CPFSK system.

SUMMARY OF THE INVENTION

An object of the present invention is to provide a PSK system and method adapted to simplify the system structure, hardly suffering from the effect of wavelength dispersion, and capable of reproducing the carrier.

According to one aspect of the present invention, there is provided a direct modulation PSK system. The system comprises a laser diode emitting a light beam at a frequency corresponding to an injection current, a bias current circuit for supplying the laser diode with a bias current, a modulating current pulse circuit for superposing a modulating current pulse with a pulse width smaller than one time slot T of a binary-coded input signal on the bias current, and an amplitude and pulse width control circuit for controlling the amplitude and pulse width of the modulating current pulse in accordance with the binary-coded input signal so that the integrated value of the frequency varied by the modulating current pulse may become $\pi$ or $-\pi$ as a phase amount.

Preferably, the pulse width of the modulating current pulse is set to be T/2m specified by the modulation index m expressed as $m = \Delta F/B$ and the time slot T, where B represents the bit rate of the input signal and $\Delta F$ represents the frequency deviation of the light beam. By the described setting, the integrated value of the frequency varied by the modulating current pulse becomes $\pi$ or $-\pi$ as a phase amount.

Preferably, the modulation index m satisfies $0.5 < m$. Thereby, the modulating current pulse with a pulse width smaller than one time slot T of a binary-coded input signal can be obtained.

According to a preferred embodiment of the present invention, an asynchronous demodulation is performed by mixing a detected signal and the detected signal delayed by one bit.

According to another preferred embodiment of the present invention, a synchronous demodulation is performed by mixing a detected signal and a carrier extracted from the detected signal.

According to another aspect of the present invention, there is provided a direct modulation PSK system, which comprises a laser diode emitting a light beam at a frequency corresponding to an injection current, a bias current circuit for supplying the laser diode with a bias current, a modulating current pulse circuit for superposing a modulating current pulse with a pulse width smaller than one time slot T of an n-value-coded input signal (n: a natural number larger than 2) on the bias current, and an amplitude and pulse width control circuit for controlling the amplitude and pulse width of the modulating current pulse in accordance with the input signal so that the integrated value of the frequency varied by the modulating current pulse may become $2\pi k/n$ or $-2\pi k/n$ (k = 1, 2, ..., (n−1)) as a phase amount.

According to yet another aspect of the present invention, there is provided a direct modulation PSK method in which an injection current, which is supplied to a laser diode emitting a light beam at a frequency corresponding to the injection current, is varied for a predetermined period of time shorter than one time slot T of an input binary coded signal, and control is performed such that the integrated value of the frequency varied in accordance with the variation in the injection current becomes $\pi$ or $-\pi$ as a phase amount.

According to a further aspect of the present invention, there is provided a direct modulation PSK method in which an injection current, which is supplied to a laser diode emitting a light beam at a frequency corresponding to the injection current, is varied for a predetermined period of time shorter than one time slot T of an input n-value-coded signal, and control is performed such that the integrated value of the frequency varied in accordance with the variation in the injection current becomes $2\pi k/n$ or $-2\pi k/n$ ($k=1, 2, \ldots, (n-1)$) as a phase amount.

The above and other features and advantages of this invention and the manner of realizing them will become more apparent, and the invention itself will best be understood, from a study of the following description and appended claims, with reference had to the attached drawings showing some preferred embodiments of the invention.

BRIEF DESCRIPTION OF THE DRAWINGS

FIG. 3A is a drawing schematically showing a waveform of a light output and a waveform of a frequency deviation in the system shown in FIG. 1;

FIG. 3B is a drawing schematically showing a waveform of a light output and a waveform of a frequency deviation in the system shown in FIG. 2;

FIGS. 4(a)-4(f), FIGS. 5(a)-5(f), FIGS. 6(a)-6(f), and FIGS. 7(a)-7(f) are drawings showing waveforms of some signals in the CPFSK system shown in FIG. 2 at the times when m is equal to 0.5, 1.0, 1.5, and 2.0, respectively;

FIGS. 8(a)-8(e), FIGS. 9(a)-9(e), FIGS. 10(a)-10(e), and FIGS. 11(a)-11(e) are drawings showing waveforms of some signals in the DM-PSK system shown in FIG. 1 at the times when m is equal to 1.0, 1.5, 2.0, and 0.5, respectively;

DESCRIPTION OF THE PREFERRED EMBODIMENTS

Figure 1:
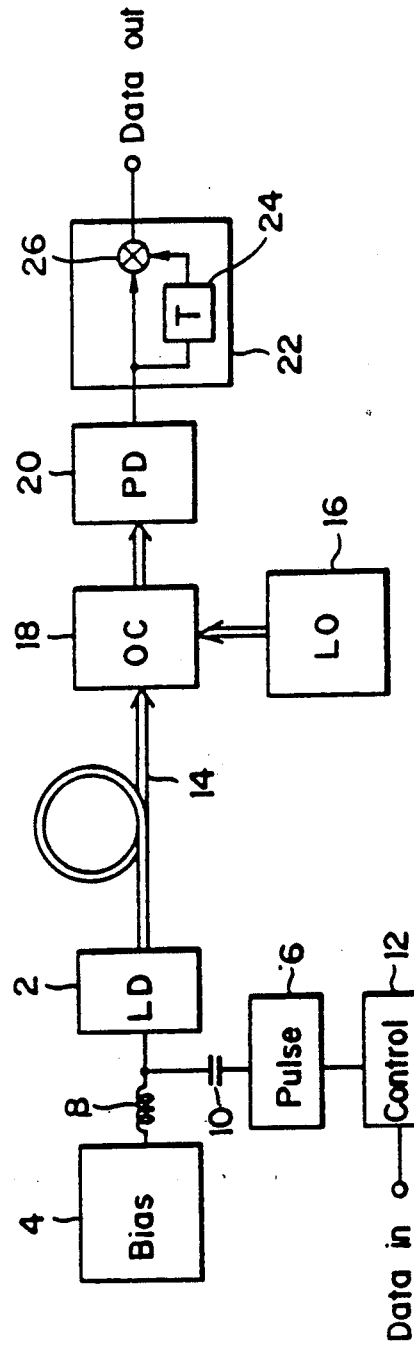
FIG. 1 is a block diagram of a DM-PSK (direct modulation phase shift keying) system as an embodiment of the present invention.

Referring to FIG. 1, there is shown a DM-PSK system with the present invention applied thereto. Reference numeral 2 denotes a laser diode in a DFB (distributed feedback) type, and this laser diode 2 outputs a light beam corresponding to an injection current. The injection current is supplied by means of a bias current circuit 4 and a modulating current pulse circuit 6. A DC current for biasing is supplied to the laser diode 2 through an inductor 8 and a high-speed modulating current pulse is supplied to the laser diode 2 through a capacitor 10. The modulating current pulse has a pulse width smaller than one time slot of a binary-coded input signal. An amplitude and pulse-width control circuit denoted by 12 controls the amplitude and pulse-width of the modulating current pulse according to the data input so that the phase of the integrated amount of the oscillation frequency of the laser diode 2 varied by the modulating current pulse may become $\pi$ or $-\pi$ at all times.

The light beam output of the laser diode 2 is sent to the reception side through an optical fiber 14. Reference numeral 16 denotes a local oscillator formed of a laser diode and its drive circuit. The local oscillator 16 outputs a local light beam with a frequency equivalent to or slightly different from the frequency of the light beam output from the laser diode 2 on the transmission side. The light beam transmitted through the optical fiber 14 and the local light beam are added up in an optical coupler 18 and input to a photodetector 20. When the received light beam and the local light beam together are input to the photodetector 20, an IF (intermediate frequency) signal including the transmitted information in the form of a phase deviation is generated by virtue of the square-law detecting characteristic of the photodetector 20, and this IF signal is input to a demodulator 22. The demodulator 22 divides the input IF signal into two portions and allows one portion thereof to be delayed by a time T, which corresponds to one time slot, by a delay circuit 24 and, thereafter, mixed with the other portion in a mixer 26, whereby a demodulated signal is output therefrom.

Figure 2:
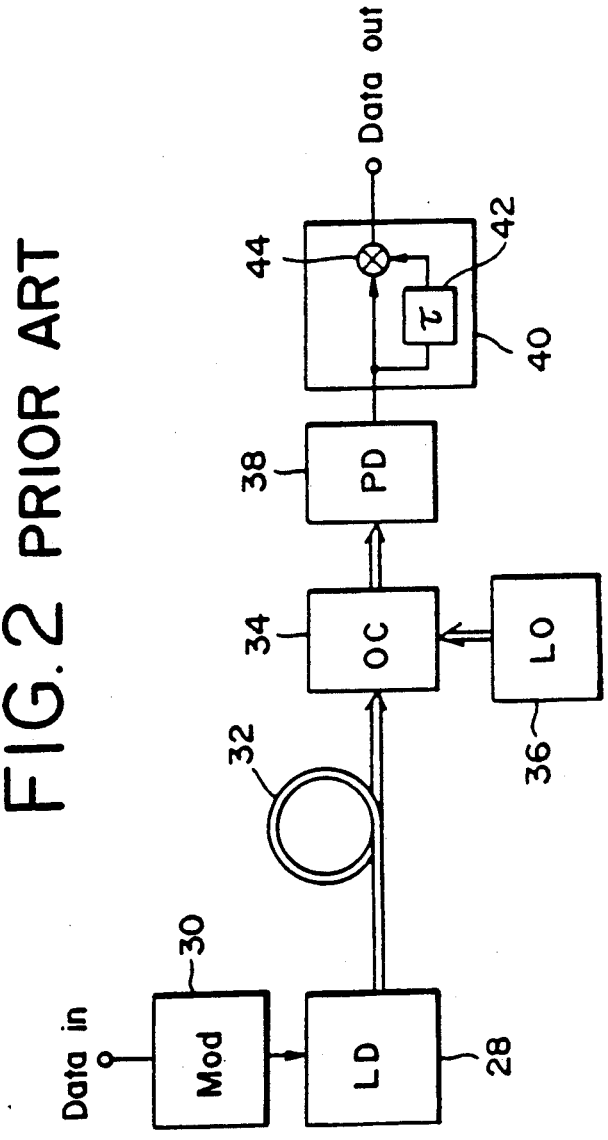
FIG. 2 is a block diagram of a CPFSK system as a prior art example.

Since making the CPFSK system understood first is considered helpful for describing the operation of the system shown in FIG. 1, a block diagram of the same is shown in FIG. 2. On the transmission side, 28 denotes a laser diode whose oscillation frequency is variable and 30 denotes a modulator for modulating the oscillation frequency of the laser diode. Here, the deviation of the oscillation frequency is adjusted according to the data input so that the phase deviation between different signs becomes larger than $\pi$. A light beam transmitted to the reception side through an optical fiber 32 is added up with a local light beam from a local oscillator 36 in an optical coupler 34 and then subjected to a photoelectric transfer in a photodetector 38. An IF signal generated by the transfer is input to a demodulator 40, wherein its one portion delayed by a predetermined period of time $\tau$ in a delay circuit 42 is mixed with the other portion in a mixer 44 so that a demodulation is performed. The delay time $\tau$ is set up according to the modulation index m as $\tau = T/2m,$ $m = \Delta F/B,$ where T represents the time of one slot, $\Delta F$ represents the frequency deviation, and B represents the bit rate. In this way, the CPFSK system is arranged such that, on its transmission side, the laser diode is directly modulated without using an external modulator and, on its reception side, the phase deviation in the IF sign is detected and thus the transmitted information is reproduced. Therefore, its system structure is relatively simple. However, the CPFSK system is susceptible to the influence of wavelength dispersion and, in addition, the carrier effective for clock generation or the like cannot be reproduced therein.

FIG. 3A and FIG. 3B are drawings schematically showing waveforms of light outputs and waveforms of frequency deviations in the DM-PSK system of the present invention and the CPFSK system, respectively. The waveforms of light outputs in the drawings are depicted with the oscillation frequency of the laser diode greatly reduced from the actual value. In the CPFSK system, the frequency is uniformly deviated during the period of time corresponding to one time slot T so that the waveform of the light output may not become discontinuous at the junction of bits. On the other hand, in the DM-PSK system, the oscillation frequency is deviated by ΔF only during a predetermined period of time τ within one time slot T and thereafter the oscillation frequency is returned to the original frequency. The values of τ and ΔF, when the input signal is a binary-coded signal, are set such that the phase deviation after the time τ will become π (−π). The value of τ corresponds to the pulse width of the modulating current pulse.

The period of time during which the frequency is deviated, the time delayed in the demodulation process, and the preferred intermediate frequency are shown in the following table for both the DM-PSK system and the CPFSK system with these values arranged in contrast with each other.

TABLE

|  | Present Invention | CPFSK System |
|---|---|---|
| Time for Freq. Deviation | (½m)T | 1T |
| Delay Time in Demodulation | 1T | (½m)T |
| Preferred IF | (2N + 1)B/2 | (2N + 1)mB/2 |

T: time slot
B: bit rate
m: modulation index (m = ΔF/B, ΔF: frequency deviation)
N: natural number FIGS. 4(a)-(f) to FIGS. 7(a)-(f) are graphs showing results of calculations of the signal waveforms in the CPFSK system with the modulation index set to 0.5, 1.0, 1.5, and 2.0, respectively. Conditions used for the calculations are as follows.

① The rise time and the fall time of the input waveform are neglected and it is assumed that the modulation is performed by a square wave.

② The modulation index m is defined by m=ΔF/B, where B represents the bit rate and ΔF represents the frequency deviation.

③ As ΔF, the maximum frequency deviation $\Delta F_{MAX}$ providing the highest reception sensitivity is employed.

$$\Delta F_{MAX} = \tfrac{1}{2}\tau = mB (\tau: \text{delay time})$$

④ The intermediate frequency $$f_{IF} = (2N + 1)/(4\tau)$$
$$= ((2N + 1)/2)mB$$
$$(N = 0, 1, 2, 3, \ldots)$$

⑤ Calculations are made with N=2 when the modulation index m=0.5, 1.0.

⑥ Calculations are made with N=1 when the modulation index m=1.5, 2.0.

Throughout the drawings from FIGS. 4(a)-(f) to FIGS. 7(a)-(f), (a) shows a code pattern for "01010", (b) shows a waveform of the IF signal, (c) shows the phase of the IF signal, and (d) shows the phase deviation referenced from the signal of code "0". What is shown here is a case in which $f_{IF0} < f_{IF1}$, where $f_{IF1}$ and $f_{IF1}$ respectively represent the IF signal frequency of the signal of code "0" and that of the signal of code "1". In the diagram (d) is also shown the time $t_{0-180}$ during which the phase of the IF signal makes a cumulative change of π. Further, (e) shows the phase of the IF signal (continuous line) and the phase of the IF signal delayed by the delay time τ (broken line) and (f) shows the demodulated waveform.

From results of the above described calculations, following things are known.

① While a '0−π' modulation is digitally performed with respect to the signal phase in the PSK system, the modulation with respect to the frequency of signal is digitally performed in the CPFSK system. Therefore, the phase deviation develops as time integration of the frequency deviation (refer to (d) in the drawings) and, when a modulation by a code "1" is applied, the phase deviation (referenced from the signal of code "0") changes at a constant rate of change which is determined by the frequency deviation. Further, the period of time during which the demodulation is carried out, i.e., the frequency deviation takes place, is one time slot.

② The time $t_{0-180}$ required for the phase to deviate π is obtained from (d) of each drawing as $$t_{0-180} = T/2m,$$

which indicates that, the larger the frequency deviation ΔF (modulation index m) is, the shorter the time $t_{0-180}$ required for the phase to deviate π becomes.

③ The time $t_{0-180}$ agrees with the delay time τ in the demodulation of the IF signal.

In the DM-PSK system of the present invention, in contrast with the above described CPFSK system, the injection current supplied to the laser diode is varied only for a predetermined period of time shorter than one slot time in achieving the phase deviation of π. At the time of demodulation, a delayed demodulation by one bit, for example, can be performed.

FIGS. 8(a)-(e) to FIGS. 11(a)-(e) are graphs showing results of calculations of signal waveforms in the DM-PSK system with the modulation index respectively set to 1.0, 1.5, 2.0, and 0.5. Conditions used for the calculations are as follows.

① The rise time and the fall time of the input waveform are neglected and it is assumed that the modulation is performed by a square wave.

② As the intermediate frequency $f_{IF}=(N/2)B$, (N=3, 4, 5, ...), $f_{IF}=2B$ is used.

Throughout the drawings, (a) shows a frequency deviation for "01010", (b) shows a waveform of the IF signal, (c) shows the phase of the IF signal, and (d) shows the phase deviation referenced from the signal of code "0". What is shown here is a case in which $f_{IF0} < f_{IF1}$, where $f_{IF0}$ and $f_{IF1}$ respectively represent the IF signal frequency of the signal of code "0" and that of code "1". Further, (e) shows the demodulated waveform. Here, the demodulated waveform can be obtained from the following calculation.

Considering that a delayed demodulation by one-bit with a delay time T is performed using a mixer, an IF signal f(t) is set as $$f(t) = A\cos(2\pi(f_{IF} + \Delta F \cdot M(t))t),$$

where M(t) is defined by $M(t)$ = 1 (in the case where the signal is of code "1" and
$NT < t < NT + \tau = NT + 1/(2m))$
= 0 (in other cases), where $\Delta F \times 1/(2m) = \pi$. If it is assumed that the frequency characteristic of the used receiver is flat and no LPF (low pass filter) changing the demodulated waveform (baseband signal) is used, then the demodulated signal g(t) is expressed as $$g(t) = f(t) \times f(t - T)$$
$$= C \cos(2\pi f_{IF} \tau + \Delta F(M(t - T) \cdot (t - T) - M(t) \cdot t)),$$

where C is a constant.

From the above results of calculations, the following facts are known as to the DM-PSK system.

① While a '$0 - \pi$' modulation is digitally performed with respect to the phase of the signal in the PSK system using an external modulator, a modulation is digitally performed with respect to the frequency of the signal in the DM-PSK system. Therefore, the phase deviation of the signal develops as time integration of the frequency deviation (refer to (d) in each drawing) and, when a modulation by a code "1" is applied, the phase deviation (referenced from the signal of code "0") changes with a constant gradient determined by the frequency deviation until the phase deviation becomes $\pi$ or $-\pi$.

② The time $t_{0-180}$ required for the phase to deviate $\pi$ is obtained as $$t_{0-180} = T/2m,$$

which indicates that, the larger the frequency deviation $\Delta F$ (modulation index m) is, the shorter the time $t_{0-180}$ required for the phase to deviate $\pi$ becomes.

③ The time $t_{0-180}$ agrees with the delay time $\tau$ in the demodulation of the IF signal in the CPFSK system.

When the DM-PSK system is thus compared with the CPFSK system, the frequencies of the signals in both of the systems are changed without producing a discontinuous change of the phase of the signals, and therefore, they are equal in that a direct modulation of the laser diode is achieved therein without using an external modulator. However, the DM-PSK system according to the present invention has an advantage over the CPFSK system that it is hardly affected by the adverse influence of the wavelength dispersion. More specifically, when the CPFSK system is used, at the time point where the eye pattern of the demodulated waveform opens, the frequency providing the demodulated signal of "1" and the frequency providing that of "0" are different and, therefore, a code error due to the wavelength dispersion is liable to occur. In contrast with that, according to the present invention, when for example the modulation index is relatively great as shown in FIG. 10, the frequency providing the demodulated signal of "1" and the frequency providing that of "0" are in agreement at the time point where the eye pattern of the demodulated waveform opens, and therefore, the deterioration in the code error rate due to the wavelength dispersion hardly occurs.

In contrast with the DPSK system, a delayed demodulation by one bit can be simply performed in the present invention without using a differential coding circuit on the transmission side. While the upper limit of the modulation band has conventionally been determined by the performance of the phase modulator, a still higher speed can be achieved in the present invention by virtue of the capability of the direct modulation.

In the present invention, the deviation of the oscillation frequency of the laser diode during only a predetermined period of time $\tau$, which is shorter than one time slot, can be provided by having an RZ signal with a suitable duty cycle generated by the amplitude and pulse width control circuit 12.

Since it is possible to perform a direct modulation of the laser diode in the system shown in FIG. 1, an external modulator is not necessary, and since a modulating current pulse is supplied to the laser diode so that the phase deviation between the different signs may become $\pi$ or $-\pi$, a differential coding circuit is not required.

Figure 12:
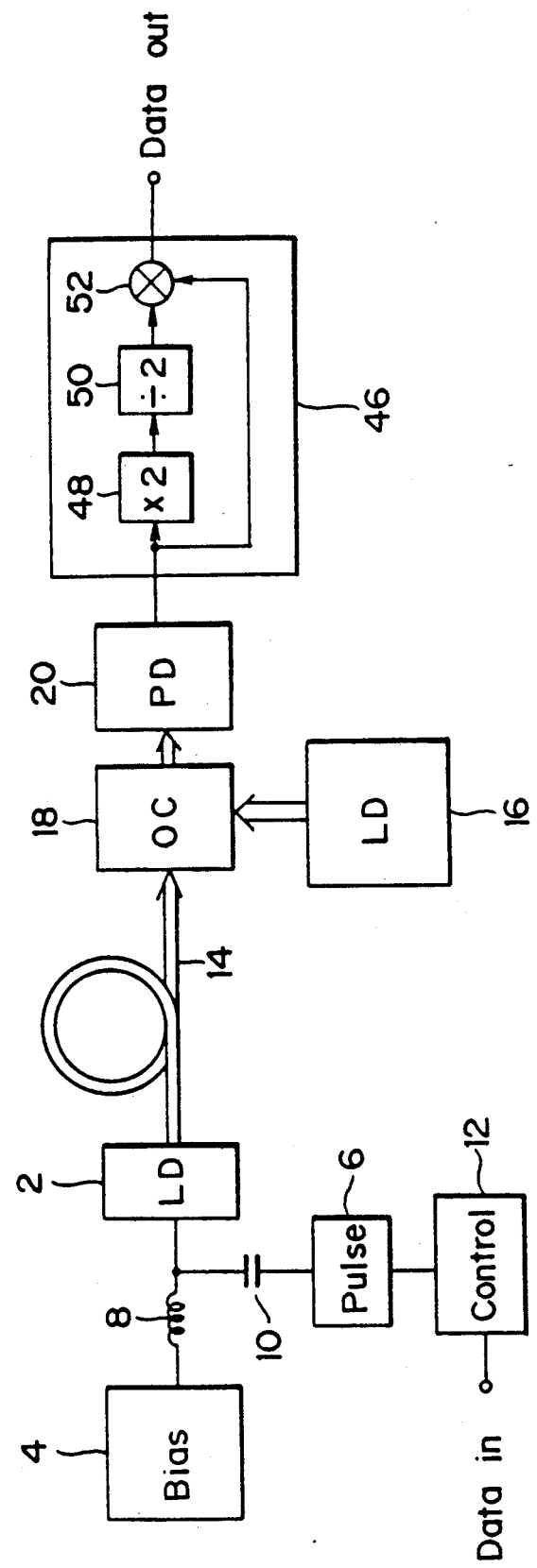
FIG. 12 is a block diagram of a DM-PSK system as another embodiment of the present invention.

FIG. 12 is a block diagram showing a DM-PSK system as another preferred embodiment of the present invention. In this system, there is used a demodulator different from that in the preceding embodiment. In the demodulator 46 of the present embodiment, 48 denotes a frequency doubler for doubling the frequency of the input IF signal and 50 denotes a frequency halver for halving the frequency of the signal with the frequency once doubled by the frequency doubler 48. The IF signal, by being passed through the frequency doubler 48 and frequency halver 50 in order of mention, is deprived of its modulation component and the carrier is reproduced. Hence, by performing mixing of this carrier with the IF signal not deprived of the modulation portion in a mixer 52, a synchronized demodulation can be achieved. In this case, by providing, as shown in FIG. 13, a delay circuit 49, which will introduce a delay time corresponding to the delay time given to a signal passed through carrier reproducing means 47 formed of the frequency doubler 48 and the frequency halver 50, phase noise can be suppressed and reception with a high sensibility can be achieved.

Figure 14:
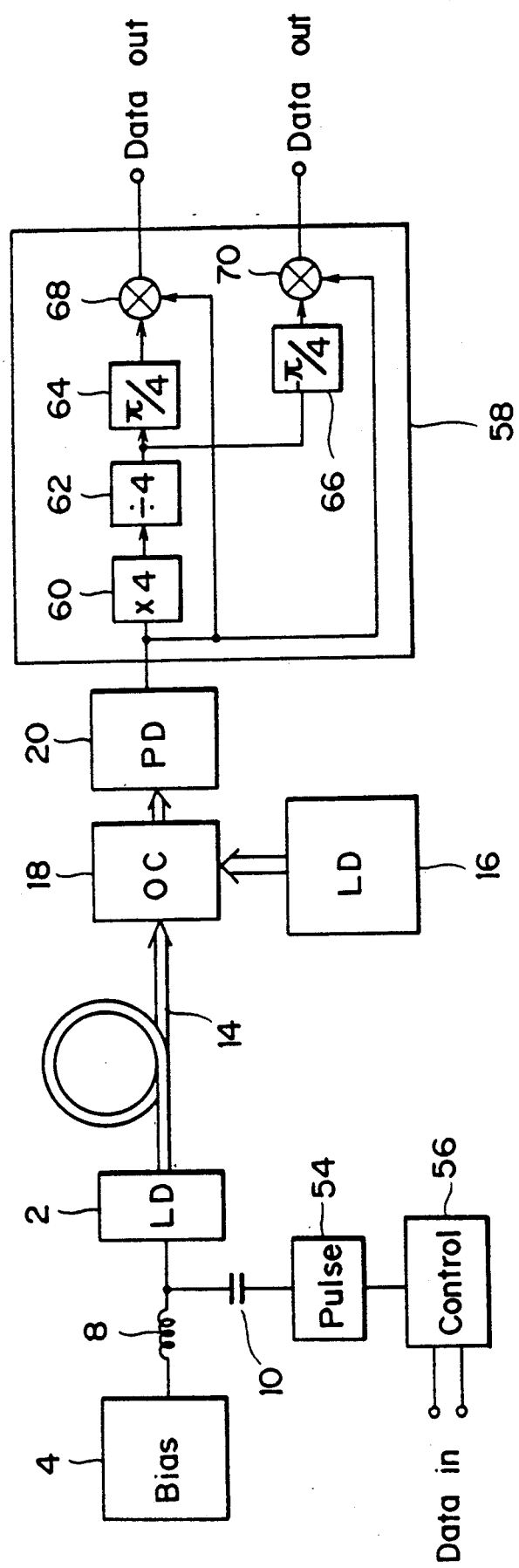
FIG. 14 is a block diagram of a DM-PSK system as a further embodiment of the present invention.

FIG. 14 is a block diagram showing a DM-PSK system as a further embodiment of the present invention. In this system, there are used a modulating current pulse circuit 54, an amplitude and pulse width control circuit 56, and a demodulator 58 of structure or operation different from those in the previous embodiments are used. The modulating current pulse circuit 54 superposes a modulating current pulse with a smaller pulse width than one time slot of an n-value-coded input signal (n: a natural number larger than 2) on the bias current. The amplitude and pulse width control circuit 56 controls the amplitude and pulse width of the modulating current pulse so that the integrated value of the oscillation frequency of the laser diode 2 varied by the modulating current pulse may become $2\pi k/n$ or $-2\pi k/n$ (k = 1, 2, ..., (n−1)) as a phase amount. The control circuit 56 is supplied, for example, with a four-value signal. The control circuit 56 performs control of the waveform of the modulating current pulse so that a frequency deviation may not be caused in a first state of the four-value states and, in second to fourth states, the phase deviation may respectively become $2\pi k/4$ (k = 1, 2, 3) with respect to the first state. More specifically, if, in the present example, the state of the phase corresponding to one of the four-value signals is 0, then the other three states of the phase become $\pi/2$, $\pi$, and $3\pi/2$, respectively.

In the demodulator 58, numeral 60 denotes a frequency quadrupler for quadrupling the frequency of the input IF signal, numeral 62 denotes a frequency quaterer for quartering the frequency of the output of the frequency quadrupler 60, numeral 64 denotes a phase shifter for shifting the phase of the output of the frequency quaterer 62 by $\pi/4$, numeral 66 denotes a phase shifter for shifting the output of the frequency quaterer 62 by $-\pi/4$, numeral 68 denotes a mixer for mixing the output of the phase shifter 64 and the IF signal, and numeral 70 denotes a mixer for mixing the output of the phase shifter 66 and the IF signal. A demodulation is performed in accordance with the carrier reproduced by the frequency quadrupler 60 and frequency quaterer 62, and first and second outputs are obtained from the mixers 68 and 70, respectively. Thereupon, by combining the first and second outputs, four-value signals can be reproduced.

Figure 13:
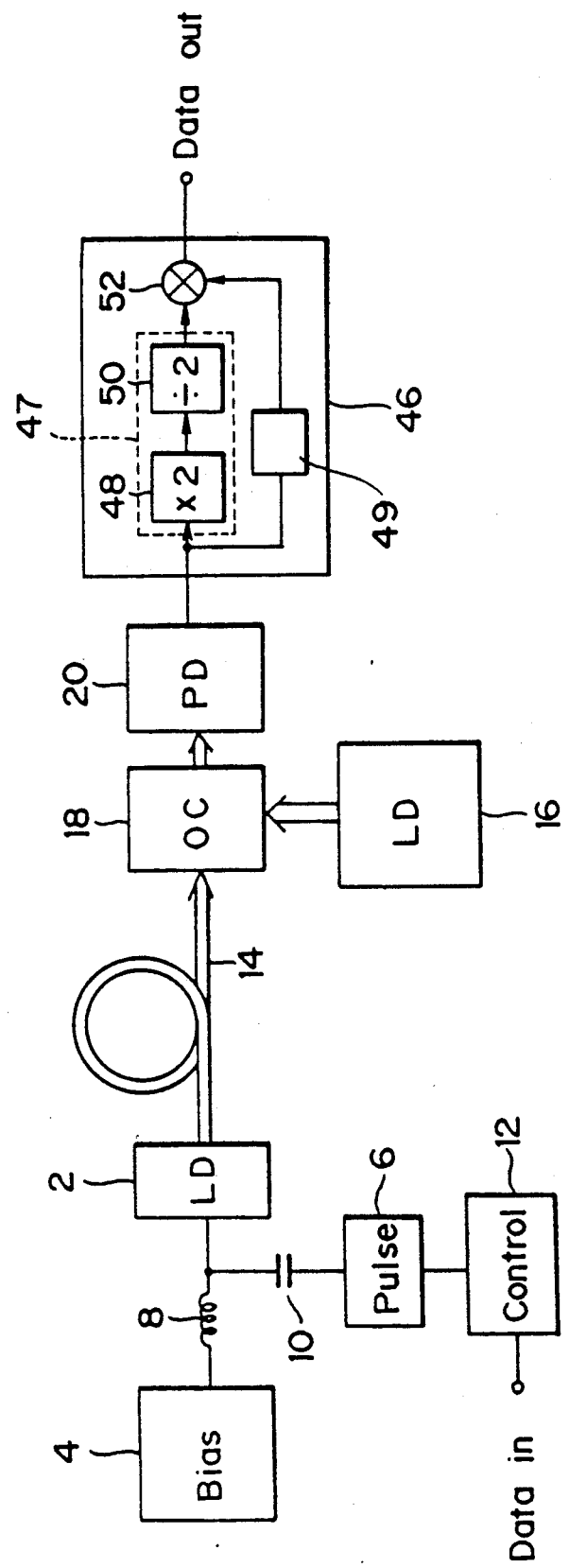
FIG. 13 is a block diagram showing another example of a demodulator in FIG. 12.
Figure 15:
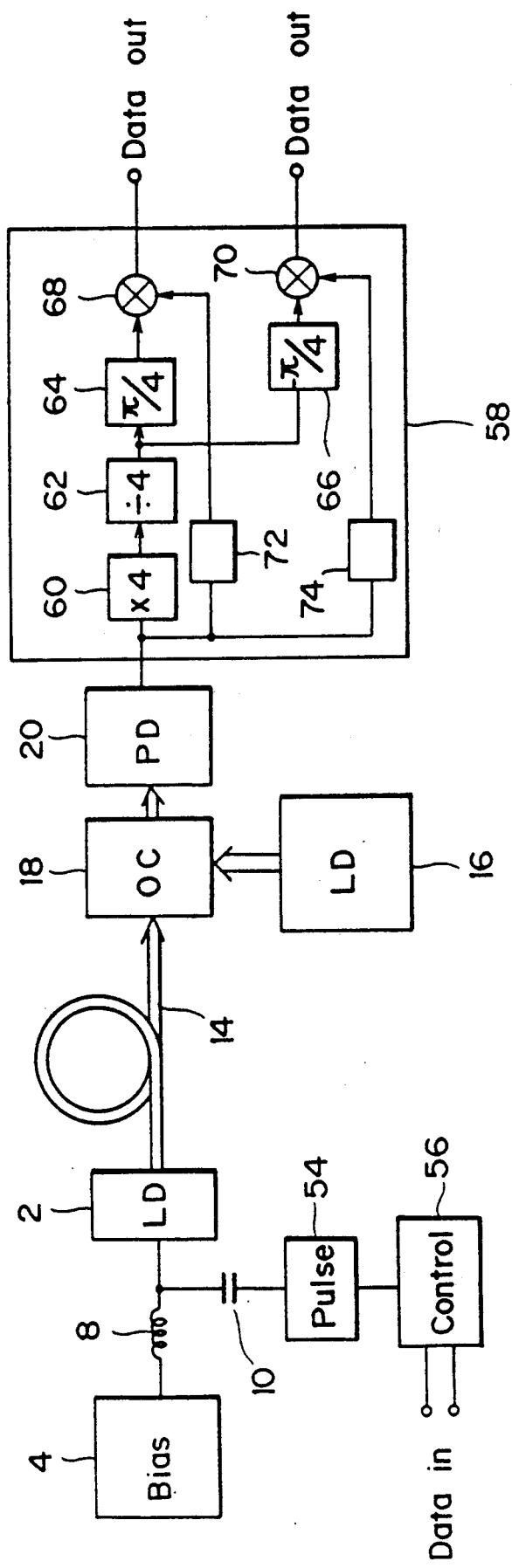
FIG. 15 is a block diagram showing another example of a demodulator in FIG. 14.

Since such a DM-PSK system dealing with many value (many phase) signals is susceptible to the influence of phase noise of the light source, by providing, as shown in FIG. 15, delay circuits 72 and 74 of similar structure to that of FIG. 13 for delaying the respective IF signals input to the mixers 68 and 70 by predetermined amounts, the phase noise can be removed quite effectively and reception with a high sensitivity can be achieved.

According to the system or method of the present invention, different from the case of the CPFSK system, the carrier can be reproduced, and therefore, a synchronized demodulation can be performed as described with FIG. 12 and FIG. 13. Further, as described with FIG. 13, generation of many-value signals can be easily achieved. Specifically, when many-value signals are obtained, the range of the spectrum becomes narrower than that in the case where many-value signals are obtained in other systems, and therefore, in carrying out frequency-division multiplexing, the number of channels in the system can be increased and in addition the system is hardly affected by an adverse influence of the wavelength dispersion.

While the above description has been made as related to specific embodiments, it is to be understood that the present invention is not limited to the details of these embodiments. For example, in the preferred embodiments shown in the drawings, description has been made of the case where the signal is binary-coded or 4-value-coded, but an 8-value or 16-value-coded signal may be used in order to increase the transmission capacity. A demodulation using a filter of a narrow band may be performed thereby reproducing the carrier. Thus, preferred embodiments described herein are given by way of illustration only and not limitative of the present invention. The scope of the invention is defined by the appended claims and all changes and modifications as fall within the equivalence of the scope of the claims are therefore to be embraced by the invention.

What is claimed is:

1. A direct modulation PSK system comprising:
   a laser diode emitting a light beam at a frequency corresponding to an injection current;
   a bias current circuit for supplying said laser diode with a bias current;
   a modulating current pulse circuit for superposing a modulating current pulse with a pulse width smaller than one time slot T of a binary-coded input signal on said bias current; and
   an amplitude and pulse width control circuit for controlling the amplitude and pulse width of said modulating current pulse in accordance with the binary-coded input signal so that an integrated value of a frequency varied by said modulating current pulse may become $\pi$ or $-\pi$ as a phase amount.

2. A PSK system according to claim 1, wherein the pulse width of said modulating current pulse is set to be T/2 m specified by a modulation index m expressed as $m = \Delta F/B$ and said time slot T, where B represents the bit rate of said input signal and $\Delta F$ represents the frequency deviation of said light beam.

3. A PSK system according to claim 2, wherein said modulation index m satisfies $0.5 < m$.

4. A PSK system according to claim 3, wherein an asynchronous demodulation is performed by mixing a detected signal and the detected signal delayed by one bit.

5. A PSK system according to claim 3, wherein a synchronous demodulation is performed by mixing a detected signal and a carrier extracted from said detected signal.

6. A PSK system according to claim 5, further comprising a demodulator for receiving an intermediate frequency (IF) signal and dividing the IF signal into two branches, wherein said demodulator comprises:
   carrier reproduction means for reproducing the carrier from a first one of the two branches of said divided IF signal;
   signal delay means for delaying a second one of the two branches of said divided IF signal by an amount corresponding to the delay time introduced by said carrier reproduction means in the signal passing therethrough; and
   a mixer for mixing said carrier and said IF signal output from said signal delay means.

7. A direct modulation PSK system comprising:
   a laser diode emitting a light beam at a frequency corresponding to an injection current;
   a bias current circuit for supplying said laser diode with a bias current;
   a modulating current pulse circuit for superposing a modulating current pulse with a pulse width smaller than one time slot T of an n-value-coded input signal, n being a natural number greater than 2, on said bias current; and
   an amplitude and pulse width control circuit for controlling the amplitude and pulse width of said modulating current pulse in accordance with an input signal so that an integrated value of a frequency varied by said modulating current pulse may become $2\pi k/n$ or $-2\pi k/n$, k being equal to 1, 2, ..., (n−1), as a phase amount.

8. A PSK system according to claim 7, wherein an asynchronous demodulation is performed by mixing a detected signal, and the detected signal is delayed by one bit.

9. A PSK system according to claim 7, wherein a synchronous demodulation is performed by mixing a detected signal and carrier extracted from said detected signal.

10. A PSK system according to claim 9, further comprising a demodulator for receiving an intermediate frequency (IF) signal and dividing the IF signal into two branches, wherein said demodulator comprises:
   carrier reproduction means for reproducing the carrier from the IF signal;

a first phase shifter for shifting the phase of said carrier by $\pi/4$;

a second phase shifter for shifting the phase of said carrier by $-\pi/4$;

a first mixer for mixing the carrier output from said first phase shifter and the IF signal; and a second mixer for mixing the carrier output from said second phase shifter and the IF signal.

11. A PSK system according to claim 10, wherein said demodulator further comprises:

first signal delay means for delaying the IF signal input to said first mixer by an amount corresponding to the delay time introduced by said carrier reproduction means and said first phase shifter in the signal passing therethrough; and second signal delay means for delaying the IF signal input to said second mixer by the amount corresponding to the delay time introduced by said carrier reproduction means and said second phase shifter in the signal passing therethrough.

12. A direct modulation PSK method comprising the steps of:

a) varying an injection current, which is supplied to a laser diode emitting a light beam at a frequency corresponding to the injection current, for a predetermined period of time shorter than one time slot T of a binary-coded input signal; and b) controlling an amplitude and pulse width of a modulating current so that an integrated value of the frequency varied in accordance with the variation in the injection current may become $\pi$ or $-\pi$ as a phase amount.

13. A PSK method according to claims 12, wherein the predetermined period of time in said step a) is set to be T/2 m specified by the modulation index m expressed as $mn = \Delta F/B$ and the time slot T, where B represents the bit rate of the input signal and $\Delta F$ represents the frequency deviation of the light beam.

14. A PSK method according to claim 13, wherein the modulation index m satisfies $0.5 < m$.

15. A direct modulation PSK method comprising the steps of:

a) varying an injection current, which is supplied to a laser diode emitting a light beam at a frequency corresponding to the injection current, for a predetermined period of time shorter than one time slot T of an input n-value-coded signal; and b) controlling an amplitude and pulse width of a modulating current so that an integrated value of the frequency varied in accordance with the variation in the injection current may become $2\pi k/n$ or $-2\pi k/n$, k being equal to 1, 2, . . . , (n−1), as a phase amount.

* * * * *

UNITED STATES PATENT AND TRADEMARK OFFICE
CERTIFICATE OF CORRECTION

PATENT NO. : 5,050,176
DATED : SEPTEMBER 17, 1991
INVENTOR(S) : TAKAO NAITO ET AL.

It is certified that error appears in the above-identified patent and that said Letters Patent is hereby corrected as shown below:

TITLE PAGE, Col. 2, after line 3, insert the following section:

--FOREIGN PATENT DOCUMENTS 235543   11/1985   Japan. --.

Col. 2, line 61, "(n-1)" should be --(n-1))--.

Col. 5, line 68, "$f_{IF1}$" (second occurrence) should be --$f_{IF0}$--;

Col. 6, line 56, "$f_{IF}$" should be --$f_{IF0}$--;
line 57, "$_0$ <" should be --<--.

Col. 12, line 6, "claims" should be --claim--.

Signed and Sealed this

Second Day of February, 1993

Attest:

STEPHEN G. KUNIN

Attesting Officer     Acting Commissioner of Patents and Trademarks